(12) United States Patent
Uchida

(10) Patent No.: US 7,136,545 B2
(45) Date of Patent: Nov. 14, 2006

(54) OPTICAL CONNECTOR DEVICE, AND OPTICAL AND ELECTRICAL CIRCUIT COMBINED BOARD USING THE SAME

(75) Inventor: Tatsuro Uchida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 146 days.

(21) Appl. No.: 10/759,833

(22) Filed: Jan. 15, 2004

(65) Prior Publication Data

US 2004/0146238 A1    Jul. 29, 2004

(30) Foreign Application Priority Data

Jan. 17, 2003    (JP)    ............... 2003-009344

(51) Int. Cl.
  G02B 6/12    (2006.01)
  G02B 6/10    (2006.01)
  H01S 3/04    (2006.01)
  H01S 5/00    (2006.01)
(52) U.S. Cl. .................. 385/14; 385/129; 385/130; 385/131; 385/132; 372/43
(58) Field of Classification Search ................ 385/14, 385/129–132; 372/43
See application file for complete search history.

(56) References Cited

U.S. PATENT DOCUMENTS 5,191,219 A    3/1993    Linke 6,055,255 A * 4/2000  Suyama et al. .......... 372/46.01
6,829,398 B1 * 12/2004 Ouchi .......................... 385/14

FOREIGN PATENT DOCUMENTS

JP    2000-199827    7/2000

\* cited by examiner

*Primary Examiner*—Brian Healy
*Assistant Examiner*—Jerry Martin Blevins
(74) *Attorney, Agent, or Firm*—Morgan & Finnegan, LLP

(57) ABSTRACT

A optical connector device, which comprises a two-dimensional optical waveguide layer; a semiconductor laser having a function capable of switching a plurality of different oscillation modes; and an optical path converting structure for converting an optical path of an outgoing light from the semiconductor laser, in which the optical path converting structure is disposed within the two-dimensional optical waveguide layer such that a radiation angle of the semiconductor laser changes within the two-dimensional optical waveguide layer upon switching over the oscillation mode of the semiconductor laser, and the outgoing light from the semiconductor laser propagates in the two-dimensional optical waveguide layer.

4 Claims, 9 Drawing Sheets

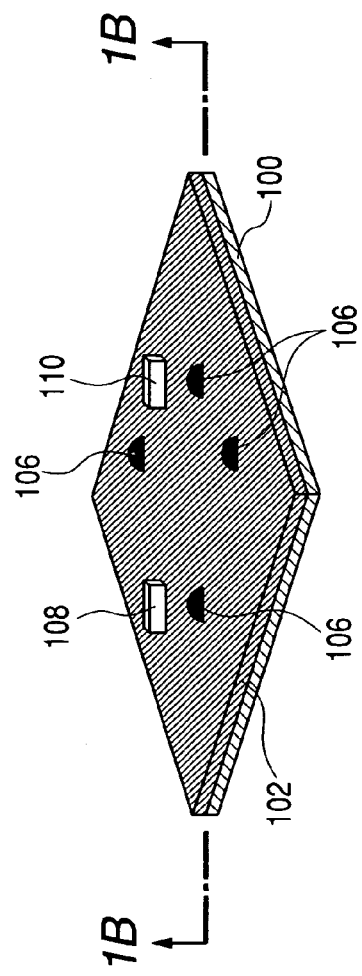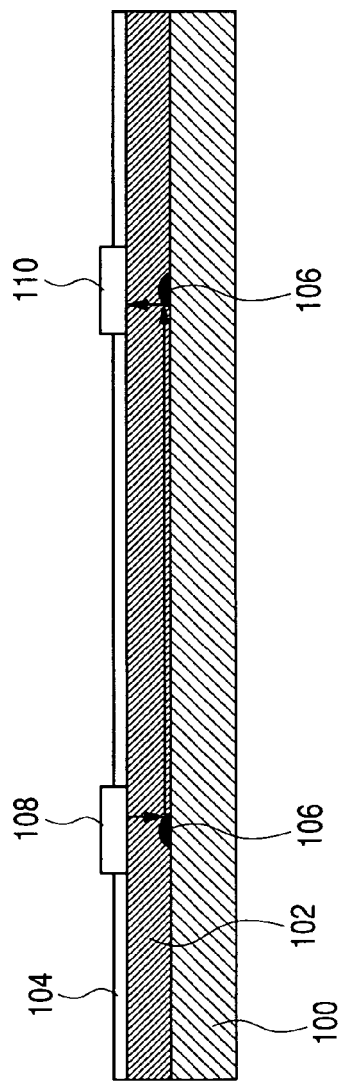

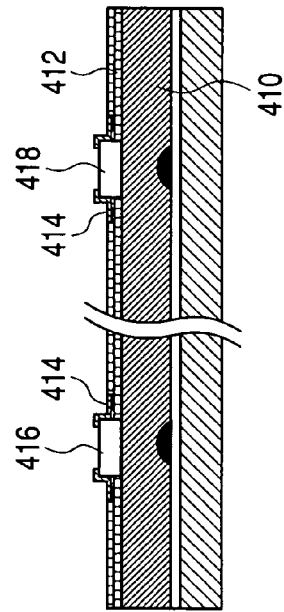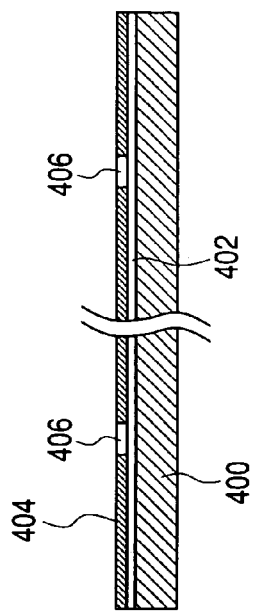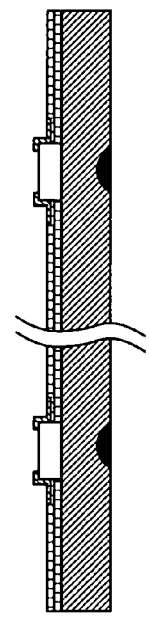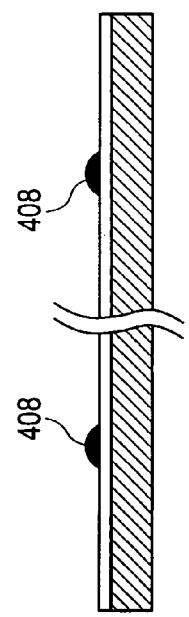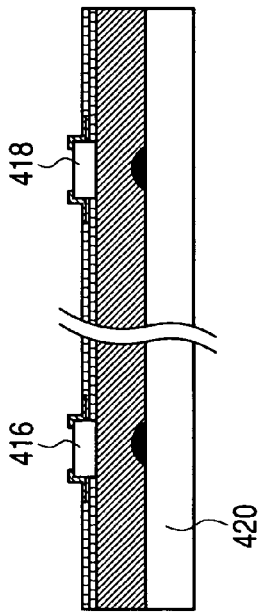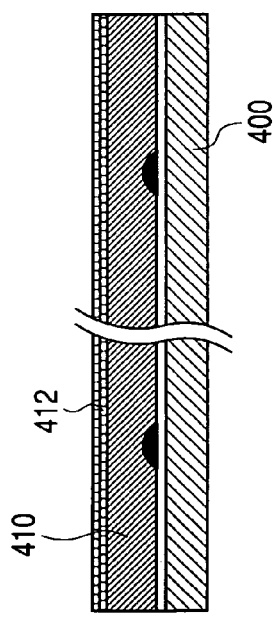

OPTICAL CONNECTOR DEVICE, AND OPTICAL AND ELECTRICAL CIRCUIT COMBINED BOARD USING THE SAME

BACKGROUND OF THE INVENTION

1. Field of the Invention

The present invention relates to an optical connector device which allows information transmission by light through a two-dimensional optical waveguide layer between a sending port having a function of sending an optical signal and a receiving port having a function of receiving an optical signal, and to an optical and electrical circuit combined board on which an electrical wiring layer and an optical circuit layer are laid together.

2. Related Background Art

Nowadays, mobile phones and personal information terminals are rapidly becoming widespread, while such equipment has an increasing demand for a further smaller size, lighter weight, and higher performance. However, the smaller size, lighter weight, and higher performance entail an increasingly higher speed and higher packing density of a circuit board, causing an urgent necessity to cope with various problems such as occurrence of a signal delay or electromagnetic interference (EMI, electromagnetic interference noise). Expected as a countermeasure to solve those problems is a technique for optical circuit that is capable of high-speed transmission and has solutions to the signal delay, signal degradation, and the electromagnetic interference noise radiated from wirings, which are problems with conventional electrical circuit.

As an example of using an advantage of the optical circuit, JP 2000-199827 A discloses a device using a mirror tilted by 45° in order to efficiently couple to an optical waveguide an outgoing light or an incident light which are perpendicular thereto.

However, since the device disclosed in JP 2000-199827 A uses a 45° mirror in order to couple light to the optical waveguide and to couple light propagating in the optical waveguide to a light-receiving device, a transmission path becomes a linear path. In the case of forming a plurality of transmission paths, positions of a light-emitting device and the light-receiving device are limited, reducing a degree of freedom in design. That is, the above device does not sufficiently utilize characteristics of the optical waveguide, and lacks flexibility in providing the optical circuit.

Furthermore, U.S. Pat. No. 5,191,219 discloses the following information processing apparatus. That is, U.S. Pat. No. 5,191,219 discloses an information processing apparatus comprising means forming a planar optical waveguide which extends in two dimensions and serves as a shared medium, a plurality of light-emitting means and a plurality of light-detecting means extending in a two dimensional arrangement over said planar optical waveguide for broadcasting light signals and abstracting light signals, respectively, into and from said planar optical waveguide and a plurality of subsystems including input and output ports for processing the light signals in the shared medium, the light-detecting means being coupled to input ports and the light-detecting means being coupled to output ports of the subsystems.

However, the information processing apparatus disclosed in U.S. Pat. No. 5,191,219 does not have sufficient flexibility in providing the optical circuit, either.

SUMMARY OF THE INVENTION

The present invention therefore has an object to provide an optical connector device that uses a two-dimensional optical waveguide layer to increase a degree of freedom in arrangement of a light-emitting device for converting an electrical signal into an optical signal and a light-receiving device for converting an optical signal into an electrical signal and that can effectively utilize characteristics of the two-dimensional optical waveguide layer to flexibly reconfigure a pattern for optical signal transmission, and an optical and electrical circuit combined board on which an electrical circuit layer and an optical circuit layer are laid together.

According to the present invention, there is provided an optical connector device, including:

a two-dimensional optical waveguide layer;

a semiconductor laser having a function capable of switching a plurality of different oscillation modes; and an optical path converting structure for converting an optical path of outgoing light from the semiconductor laser, in which the optical path converting structure is disposed within the two-dimensional optical waveguide layer such that a radiation angle of the semiconductor laser changes within the two-dimensional optical waveguide layer upon switching over the oscillation mode of the semiconductor laser, and the outgoing light from the semiconductor laser propagates in the two-dimensional optical waveguide layer.

According to the present invention, there is provided an optical and electrical circuit combined board, including the optical connector device according to the present invention formed so as to obtain electrical connection with an electrical circuit board, in which a part of or whole signals from the electrical circuit board are transmitted by optical circuit as transmission of optical signals using the optical connector device.

In the optical connector device according to the present invention, the semiconductor laser capable of switching the different oscillation modes by electrical control or the like and spatial characteristics of the two-dimensional optical waveguide layer are effectively utilized, so that a transmission circuit for the optical signal can be flexibly reconfigured through the two-dimensional optical waveguide layer.

BRIEF DESCRIPTION OF THE DRAWINGS

FIGS. 1A and 1B are respectively a perspective view and a sectional view of an optical connector device according to a first embodiment of the present invention;

FIGS. 4A, 4B, 4C, 4D, 4E and 4F are diagrams for explaining a manufacturing method for the optical connector device according to the first embodiment of the present invention;

DESCRIPTION OF THE PREFERRED EMBODIMENTS

Figure 2B:
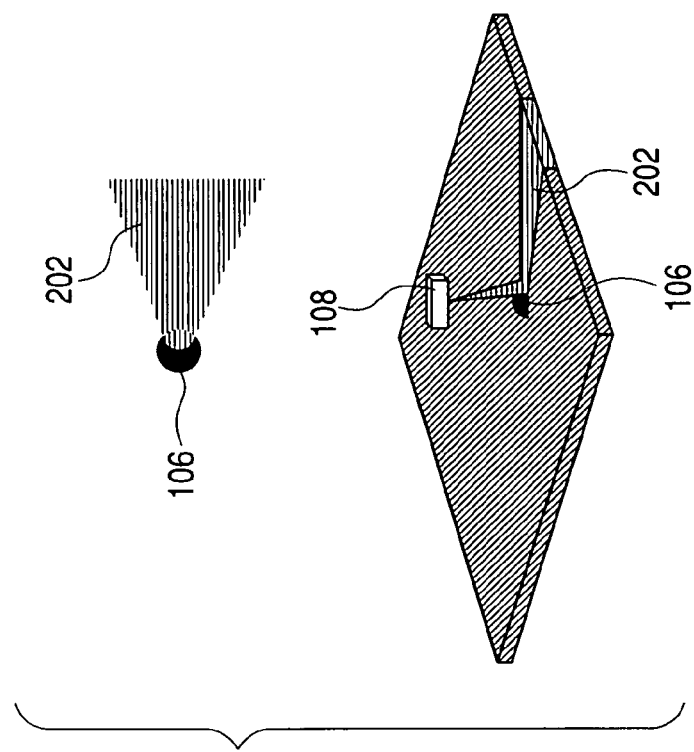
FIGS. 2A and 2B are diagrams for explaining how optical coupling takes place between a vertical cavity surface-emitting laser and an optical path converting structure according to the first embodiment of the present invention.

An optical connector device according to the present invention has such a structure described above.

In the optical connector device according to the present invention, the semiconductor laser capable of switching an oscillation mode to a different one by changing an injection current or the like is used. Therefore, by using a different oscillation mode for the semiconductor laser to couple its outgoing light to an optical path converting structure arranged within a two-dimensional optical waveguide layer, it becomes possible in optical signal transmission within the two-dimensional optical waveguide layer that selection is made from states of propagation at different radiation angles such as beam light propagation and diffused light propagation. Accordingly, spatial characteristics of the two-dimensional optical waveguide layer can be effectively utilized to increase a degree of freedom in arrangement of a light-emitting device and a light-receiving device and to flexibly reconfigure a pattern for the optical signal transmission. The semiconductor laser is used as the light-emitting device in the optical connector device according to the present invention in terms of capability of oscillating laser light having a light intensity sufficient for reliable optical signal transmission, ease of packaging, sufficiently low power consumption, and the like.

In the present invention, any semiconductor laser, such as a surface-emitting laser (a VCSEL or the like) or an edge-emitting laser, may be used as far as the oscillation modes can be switched for the semiconductor laser by control such as electrical control based on a change in an injection current or an applied voltage and temperature control. Typically, the semiconductor laser is a vertical cavity surface-emitting laser formed with a current blocking layer in the vicinity of an active layer, and the oscillation modes of the vertical cavity surface-emitting laser are switched by controlling at least one of a shape of an aperture (current path) of the current constricting layer and an injection current amount of the vertical cavity surface-emitting laser to change a radiation angle of a far-field image. In the above arrangement, the optical path converting structure can be a structure that is arranged in the vicinity of the semiconductor laser so as to couple to the outgoing light from the semiconductor laser and has a hemispherical shape, a cuneiform, a conical shape, or a shape of a pyramid with a polygonal base.

An optical and electrical circuit combined board according to the present invention is characterized by including the above optical connector device formed so as to obtain electrical connection with an electrical circuit board, and is characterized in that a part of or whole signals from the electrical circuit board are transmitted by optical circuits as transmission of optical signals using the optical connector device to operate electronic equipment including the electrical circuit board.

Hereinafter, in order to clarify an embodiment mode of the present invention, specific embodiments will be described with reference to the drawings.

First Embodiment

FIGS. 1A and 1B are diagrams showing an optical connector device according to a first embodiment of the present invention. FIG. 1B is a sectional view taken along a line 1B—1B of FIG. 1A being a perspective view. In FIGS. 1A and 1B, reference numeral 100 denotes a first cladding layer of a two-dimensional optical waveguide layer; 102, a core layer of the two-dimensional optical waveguide layer; 104, a second cladding layer of the two-dimensional optical waveguide layer; 106, an optical path converting structure; 108, a light-emitting device serving as a light output port; and 110, a light-receiving device serving as a light input port. The two-dimensional optical waveguide layer having a sheet-like shape is structured by combining materials having different refractive indices, that is, by sandwiching the core layer 102 (a portion having a relatively large refractive index) with the first cladding layer 100 and the second cladding layer 104 (portions each having a relatively small refractive index). In this embodiment, polycarbonate Z (PCZ (trade name)) having a refractive index of 1.59 is used as the core layer 102 having a thickness of 120 µm, a glass substrate having a refractive index of 1.53 is used as the first cladding layer 100, and a norbornene resin (Arton (trade name)) having a refractive index of 1.53 is used as the second cladding layer 104 having a thickness of 50 µm.

In this embodiment, materials used for the core layer 102, the first cladding layer 100, and the second cladding layer 104 are polycarbonate Z (trade name), glass, and a norbornene resin, respectively, but are not limited thereto. The materials may be a combination including a polyimide resin, and an acrylic resin, as far as the refractive index of the material for the core layer has a larger value than those of the materials for the first cladding layer and the second cladding layer. Also, the thicknesses of the respective layers are not limited to the values set in this embodiment. For example, a resin film is used instead of the glass substrate to set the thickness of the two-dimensional optical waveguide layer to several hundred µm, allowing the two-dimensional optical waveguide layer to be handled as the flexible layer.

In this embodiment, a vertical cavity surface-emitting semiconductor laser (VCSEL) is used as the light-emitting device 108, and is mounted within the two-dimensional optical waveguide layer so as to be embedded therein. The 850 nm vertical cavity surface-emitting semiconductor laser used in this embodiment has a current blocking structure by subjecting an $Al_{0.98}Ga_{0.02}As$ layer to wet oxidation using water vapor. The vertical cavity surface-emitting semiconductor laser has a circular mesa diameter of 20 µm and an oxidation aperture diameter of 4 µm. Also, an electrode on an outgoing port side has a structure having a circular aperture of 8 µm in diameter. The structure has its parameters set in order to obtain a radiation angle for a single transverse mode and a unimodal distribution in a small-current region after the threshold, and to obtain a far-field image having a bimodal distribution or a ring shape in a large-current region other than the small-current region. In this structure, a change in refractive index due to carrier injection need not be taken into consideration, and a change in gain is instead used to control the oscillation modes of the vertical cavity surface-emitting laser.

The radiation angle of the far-field image of the vertical cavity surface-emitting semiconductor laser can be changed from ±3° to ±20° by changing an injection current value. More specifically, the laser stably operates in the single transverse mode in a region with the injection current value being equal to or more than 0.4 mA and less than 1.2 mA, in which each of the near-field image and the far-field image exhibits a unimodal distribution (Gaussian distribution) and has a radiation angle of ±3°. On the other hand, the laser operates in a multi-transverse mode after a threshold gain of a higher mode is reached in the large-current region with the injection current value being equal to or more than 1.2 mA, in which each of the near-field image and the far-field image exhibits a bimodal distribution. By changing the injection current value in this large-current region, the radiation angle can be changed from ±3° to ±20°.

Figure 2A:
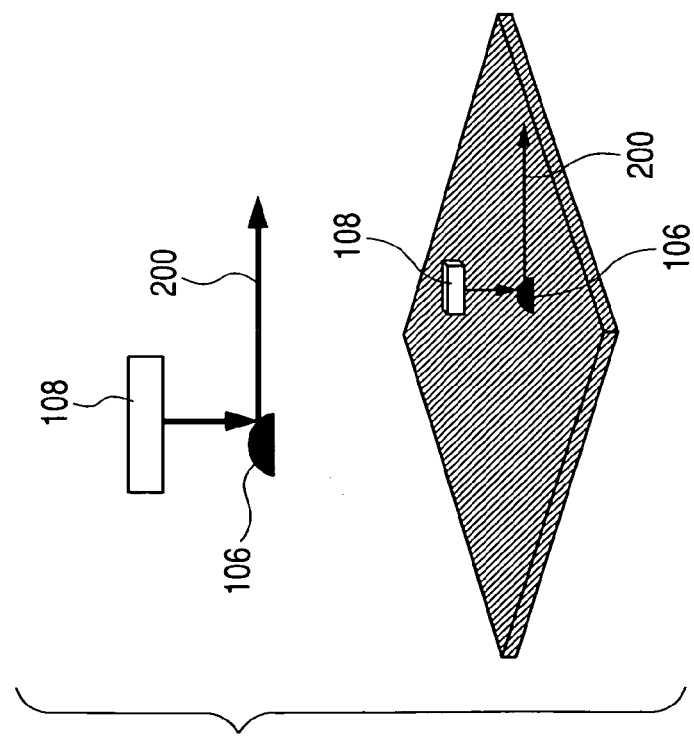

Also within the two-dimensional optical waveguide layer, the optical path converting structure 106 formed to have a hemisphere of 50 μm in radius is provided in the vicinity of the light-emitting device (surface-emitting laser) 108 and the light-receiving device 110. FIGS. 2A and 2B show a positional relationship between the optical path converting structure 106 and the vertical cavity surface-emitting laser 108. An outgoing port of the vertical cavity surface-emitting laser 108 is deviated with respect to a vertex of the optical path converting structure 106 of a hemispherical shape. As shown in FIG. 2A, in the case where laser light having a radiation angle of ±3° is incident from above, the laser light is coupled to the optical path converting structure 106 in a position deviated from the vertex to be bent by approximately 90°, and propagates in the two-dimensional optical waveguide layer as a beam light 200. On the other hand, as shown in FIG. 2B, in the case where laser light having a radiation angle of equal to or more than ±3° is incident from above, the laser light is coupled to the optical path converting structure 106 in a given region deviated from the vertex to be bent by approximately 9°°, and propagates in the two-dimensional optical waveguide layer as a diffused light 202 having a spread angle of 90° at maximum. Then, the beam light 200 or the diffused light 202 that propagates in the two-dimensional optical waveguide layer is bent upward by approximately 90° at another optical path converting structure 106 provided in the vicinity of the light-receiving device 110 to thereby be coupled to the light-receiving device 110.

In this embodiment, the 850 nm vertical cavity surface-emitting semiconductor laser is used, but there is no limitation thereto. The vertical cavity surface-emitting laser having any waveband, such as a 780 nm band or a 980 nm band, may be used as far as its structure is capable of controlling the current blocking layer. Also, in this embodiment, the optical path converting structure 106 having a hemispherical shape of 50 μm in radius is used, but there is no limitation thereto. The optical path converting structure 106 can be formed to have a hemispherical shape of a size that is arbitrarily selected by balancing among the radiation angle of the far-field image of the laser light, the thickness of the core layer, and the spread angle of the laser light propagating in the optical waveguide.

Figure 3A:
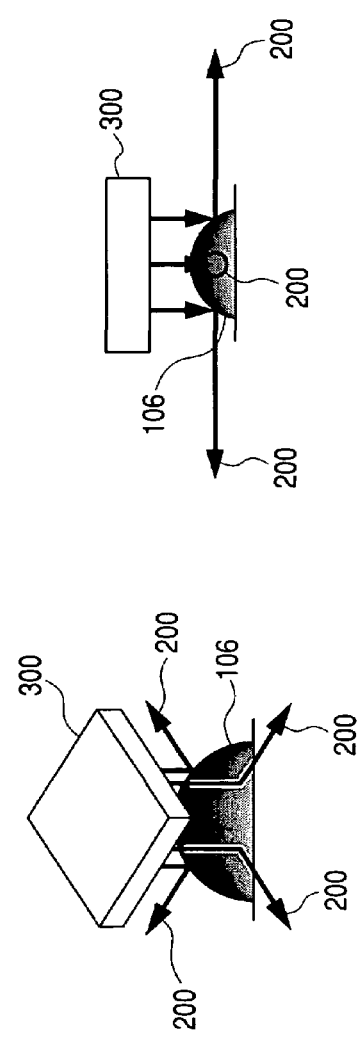
FIGS. 3A and 3B are diagrams for explaining how optical coupling takes place between a vertical cavity surface-emitting laser array and the optical path converting structure according to the first embodiment of the present invention.
Figure 3B:
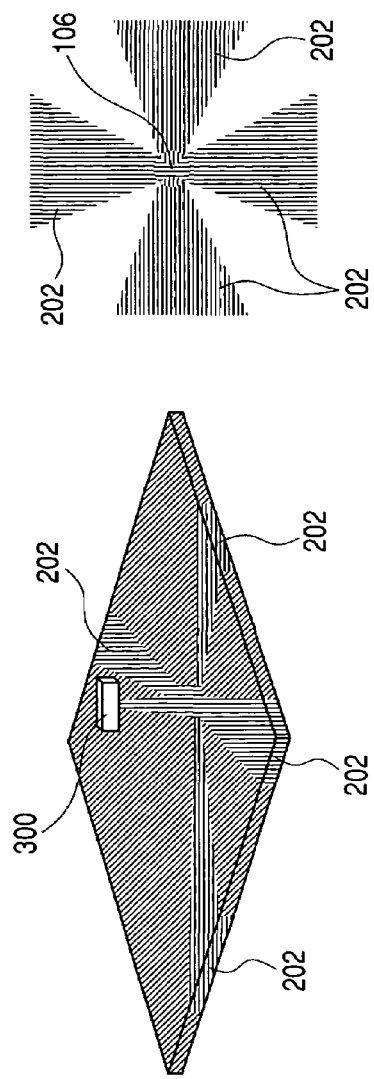

Alternatively, a form shown in FIGS. 3A and 3B is also possible. In this form, a two-by-two vertical cavity surface-emitting laser array 300 is used and arranged such that an outgoing port of each vertical cavity surface-emitting laser is deviated with respect to a vertex of the optical path converting structure 106 having a hemispherical shape as shown in FIG. 3A. Therefore, as shown in FIG. 3B, diffused lights 202 can be caused to propagate over an entire area within the two-dimensional optical connector device. Naturally, as shown in FIG. 3A, by controlling the injection current, beam lights 200 can also be caused to propagate in four directions. In addition, by independently controlling the injection current to each vertical cavity surface-emitting laser, the beam light propagation and the diffused light propagation are concurrently possible, allowing further reconfiguring of optical circuit. Here, the two-by-two vertical cavity surface-emitting laser array is used, but is not limited thereto. There can be used a light-emitting element obtained by arraying a larger number of vertical cavity surface-emitting lasers.

Next, description will be made of a manufacturing method for the optical connector device according to this embodiment. FIGS. 4A to 4F are diagrams for schematically explaining the manufacturing method. In the figures, reference numeral 400 denotes a glass substrate; 402, a plating entire surface electrode; 404, a photoresist; 406, a plating window; 408, an optical path converting structure; 410, a core layer; 412, a second cladding layer; 414, an electrode; 416, a vertical cavity surface-emitting laser; 418, a light-receiving device; and 420, a first cladding layer.

First, as shown in FIG. 4A, Cr/Au is deposited as the plating entire surface electrode 402 on the glass substrate 400 which will become a first cladding layer. Then, patterning of the photoresist 404 is performed by photolithography, and the plating window 406 is formed in an appropriate pattern (for example, a plurality of minute circular windows are formed) in a position where the optical path converting structure 408 is to be formed. Subsequently, as shown in FIG. 4B, Ni electrolytic plating is performed so as to form a plating member to be formed in the plating window 406 to have a hemispherical shape of 50 μm in radius. Then, the photoresist 404 is removed to form the optical path converting structure 408. Subsequently, as shown in FIG. 4C, a polycarbonate resin having a larger refractive index than the glass substrate 400 is applied and cured to form the core layer 410 having a film thickness of 120 μm. Then, a norbornene resin having a smaller refractive index than the core layer 410 is applied and cured to form the second cladding layer 412 having a film thickness of 50 μm.

Subsequently, as shown in FIG. 4D, the electrode 414 is formed on the second cladding layer 412. At this time, a hole for mounting the vertical cavity surface-emitting laser 416 is formed by laser beam machining so as to couple an outgoing beam from the vertical cavity surface-emitting laser 416 to the optical path converting structure 408. At the same time, a hole for mounting the light-receiving device 418 is also formed above the optical path converting structure 408 in alignment therewith. Then, the vertical cavity surface-emitting laser 416 and the light-receiving device 418 are mounted by being inserted into corresponding mounting holes using a flip chip bonder. Subsequently, as shown in FIG. 4E, a portion at or upper than a level of the core layer 410 is peeled off from the glass substrate 400. After that, as necessary, as shown in FIG. 4F, the portion at or upper than the level of the core layer 410 that has been peeled off is bonded to the first cladding layer 420 having a smaller refractive index than the core layer. By using a norbornene resin film or the like as the first cladding layer 420, a two-dimensional optical connector device can be obtained, which can be bent flexibly. The materials used here for the first cladding layer, the core layer, and the second cladding layer are a norbornene resin film, polycarbonate Z (trade name), and a norbornene resin, respectively, but are not limited thereto. The materials may be a combination including a polyimide resin, and an acrylic resin, as far as the refractive index of the material for the core layer has a larger value than those of the materials for the first cladding layer and the second cladding layer. Also, the first cladding layer and the second cladding layer are not always necessary.

The following forms are also possible. There are several kinds of method of controlling the semiconductor laser by changing the oscillation modes based on the injection current or the like. For example, there is a method of adjusting a balance between a refractive index and a gain. By forming a current constricting layer in the vicinity of the active layer of a VCSEL and regulating a path for carriers to be injected in the active layer, a change in refractive index and a change in gain occur concurrently in accordance with a change in carrier density. The balance between those factors are changed depending on a shape of an aperture (a current path) of the current constricting layer, a distance between the current constricting layer and the active layer, a current distribution, a shape of an outgoing surface, or the like. For example, as described in the above embodiment, the far-field image of the single transverse mode and the unimodal distribution can be obtained in a given current region, and the far-field image of the bimodal distribution can be obtained in another given current region. There is another method in which separate electrodes are used to change portions of the electrodes to be used for current injection, and the current path flowing in the active layer is changed more positively.

Further, by using temperature dependency of an active layer gain spectrum, light-emitting patterns can be changed between, for example, oscillation of a basic mode in a given temperature region and light emission of an LED mode due to deviation between a gain spectrum and an oscillator spectrum in another given temperature region.

Further, when the semiconductor laser and the optical path converting structure are arranged within the two-dimensional optical waveguide layer, by adjusting relative positions of the semiconductor laser and the optical path converting structure, it is possible to change a pattern of an optical path converted by the optical path converting structure. For example, when the light emitted from the semiconductor laser is a Gaussian beam, as in the above embodiment, the optical path converting structure having a hemispherical shape is disposed in a position approximately 100 μm (such a distance as to keep the beam from spreading so widely) apart from a light-emitting point such that the vertex of the optical path converting structure is deviated from a position of the beam. Therefore, a side surface of the optical path converting structure can function as a mirror to limit scattering directions of the light. Alternatively, in the case where the light emitted from the semiconductor laser has a bimodal distribution or a ring-shaped far-field image, while the optical path converting structure is disposed in the same manner as above, it is possible to scatter the light around 360° (diffused light propagation).

As described above, the semiconductor laser, by which a plurality of radiation angles can be obtained by electrical control, temperature control, or the like, and the optical path converting structure are appropriately selected. Accordingly, optical transmission, which includes beam propagation in one case and diffused light propagation in another case, can be performed through the two-dimensional optical waveguide layer.

Second Embodiment

Figure 5A:
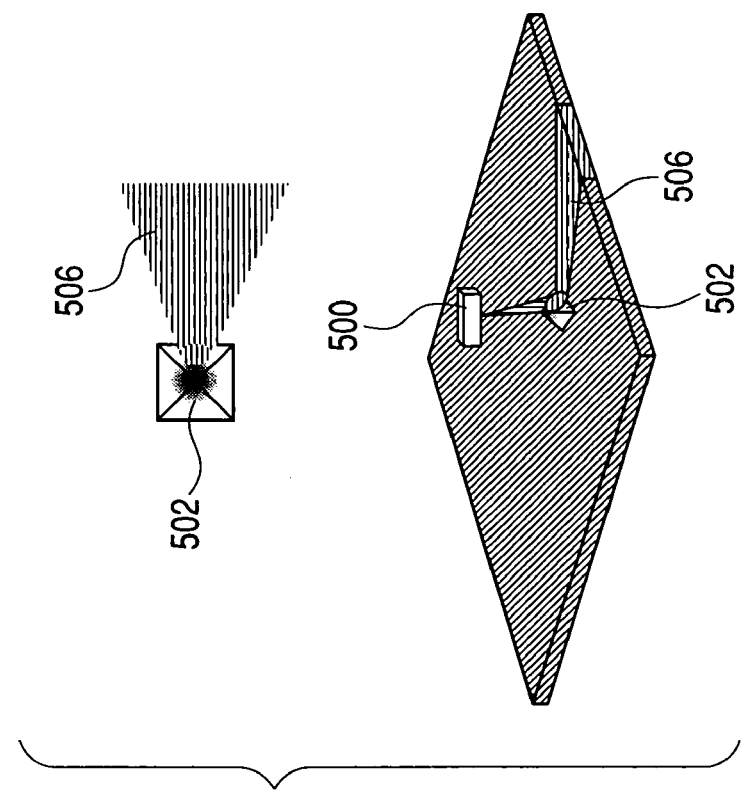
FIGS. 5A and 5B are diagrams for explaining how optical coupling takes place between a vertical cavity surface-emitting laser and an optical path converting structure according to a second embodiment of the present invention.
Figure 5B:
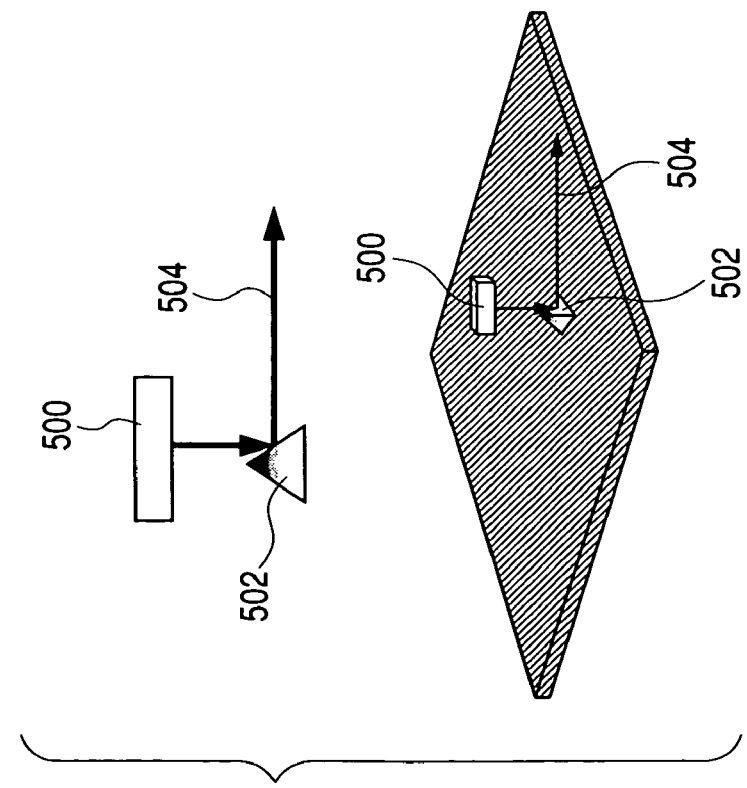

A second embodiment of the present invention is characterized in that the optical path converting structure has a quadratic-pyramid shape. Other structural features of this embodiment are the same as those of the first embodiment. FIGS. 5A and 5B show a positional relationship between an outgoing port of a vertical cavity surface-emitting laser 500 and an optical path converting structure 502 having a quadratic-pyramid shape. The optical path converting structure 502 having a quadratic-pyramid shape is 50 μm in height. The outgoing port of the vertical cavity surface-emitting laser 500 is deviated with respect to a vertex of the optical path converting structure 502 having a quadratic-pyramid shape. As shown in FIG. 5A, in the case where laser light having a radiation angle of +30 is incident from above, the laser light is coupled to the optical path converting structure 502 to be bent by approximately 90°, and propagates in the two-dimensional optical waveguide layer as a beam light 504. On the other hand, as shown in FIG. 5B, in the case where laser light having a radiation angle of equal to or more than ±3° is incident from above, the laser light is coupled to a given region of the optical path converting structure 502 to be bent by approximately 90°, and propagates in the two-dimensional optical waveguide layer as a diffused light 506 having a spread angle of 90° at maximum. Then, the light that propagates in the two-dimensional optical waveguide layer is bent upward by approximately 90° at another optical path converting structure provided in the vicinity of the light-receiving device to thereby be coupled to the light-receiving device (not shown).

In this embodiment, the optical path converting structure 502 having a quadratic-pyramid shape of 50 μm in height is used, but there is no limitation thereto. The optical path converting structure 502 can be formed to have a quadric-pyramid shape of a height that is arbitrarily selected by balancing among the radiation angle of the far-field image of the laser light, the thickness of the core layer, and the spread angle of the laser light propagating in the optical waveguide.

Figure 6A:
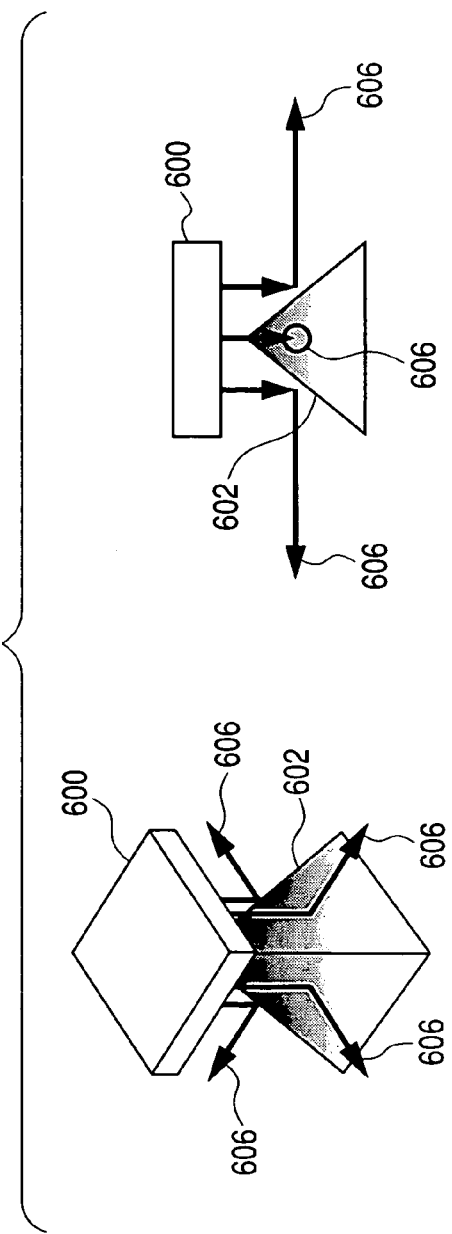
FIGS. 6A and 6B are diagrams for explaining how optical coupling takes place between a vertical cavity surface-emitting laser array and the optical path converting structure according to the second embodiment of the present invention.
Figure 6B:
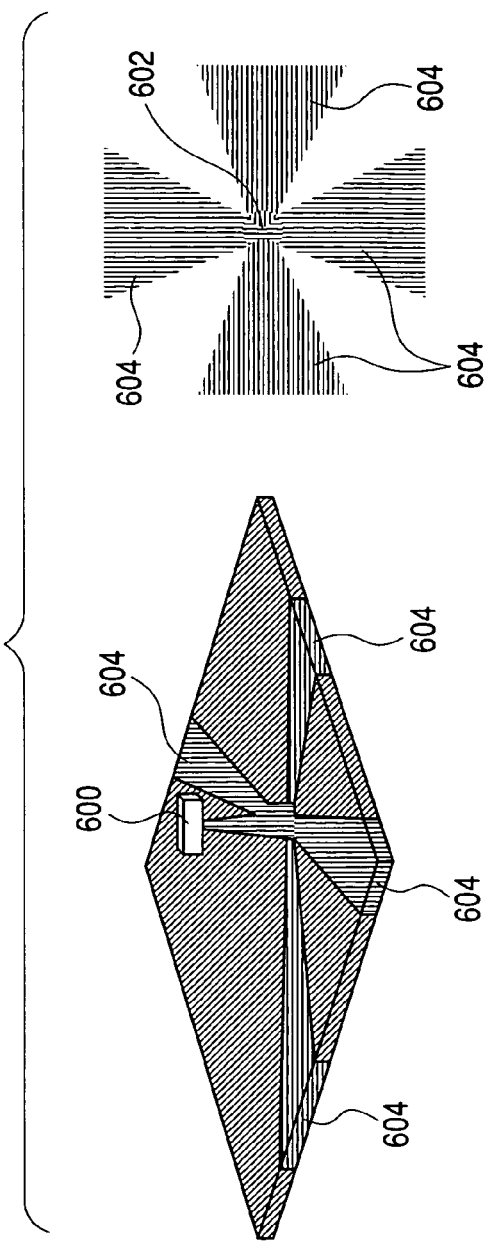

Alternatively, a form shown in FIGS. 6A and 6B is also possible. Here, a two-by-two vertical cavity surface-emitting laser array 600 is used and arranged such that an outgoing port of each vertical cavity surface-emitting laser is deviated with respect to a vertex of an optical path converting structure 602 having a quadratic-pyramid shape. Therefore, as shown in FIG. 6B, diffused lights 604 can be caused to propagate over an entire area within the two-dimensional optical waveguide layer. Naturally, as shown in FIG. 6A, by controlling the injection current, beam lights 606 can also be caused to propagate in four directions. In addition, by independently controlling the injection current to each vertical cavity surface-emitting laser, the beam light propagation and the diffused light propagation are concurrently possible, allowing further reconfiguring of optical circuit. In this embodiment, the optical path converting structure has a quadratic-pyramid shape, but there is no limitation thereto. The optical path converting structure may have a cuneiform or a shape of a pyramid with a polygonal base. Instead of the two-by-two vertical cavity surface-emitting laser array used in the form shown in FIGS. 6A and 6B, there can be used a light-emitting device obtained by arraying the same number of vertical cavity surface-emitting lasers as the number of triangular side faces of the optical path converting structure.

Next, description will be made of a manufacturing method for the optical connector device according to this embodiment. FIGS. 7A to 7F are diagrams for schematically explaining the manufacturing method. In the figures, reference numeral 700 denotes a glass substrate; 702, a plating entire surface electrode; 704, a photoresist; 706, a plating window; 708, an optical path converting structure having a hemispherical shape; 710, an optical path converting-structure having a quadratic-pyramid shape; 712, a core layer; 714, a second cladding layer; 716, an electrode; 718, a vertical cavity surface-emitting laser; 720, a light-receiving device; and 722, a first cladding layer.

Figure 7D:
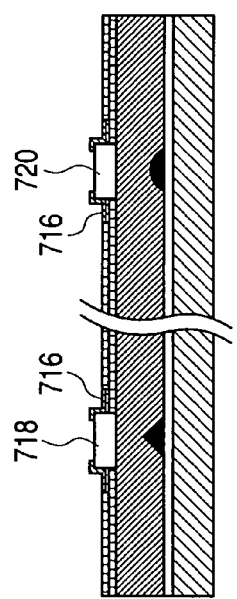
FIGS. 7A, 7B, 7C, 7D, 7E and 7F are diagrams for explaining a manufacturing method for the optical connector device according to the second embodiment of the present invention.
Figure 7E:
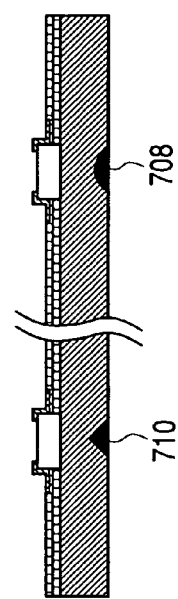
Figure 7F:
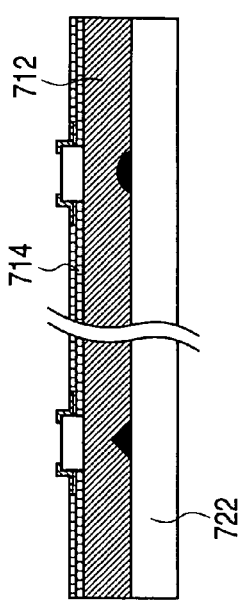
Figure 7A:
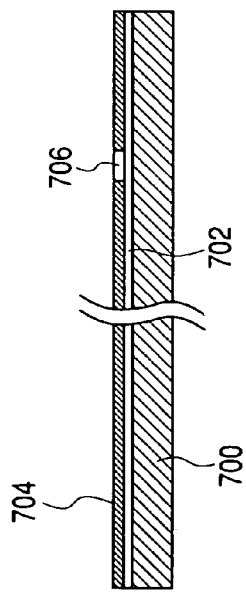
Figure 7B:
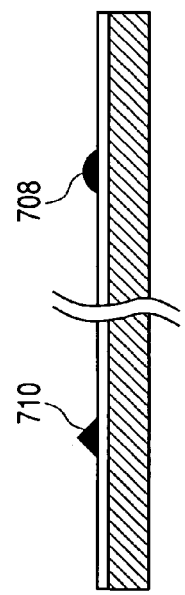
Figure 7C:
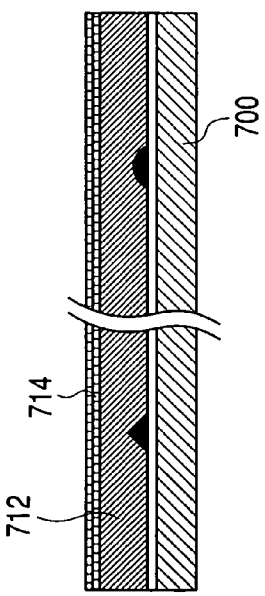

First, as shown in FIG. 7A, Cr/Au is deposited as the plating entire surface electrode 702 on the glass substrate 700 which will become a first cladding layer. Then, patterning of the photoresist 704 is performed by photolithography, and the plating window 706 is formed in a position where the optical path converting structure 708 having a hemispherical shape is to be formed. Subsequently, as shown in FIG. 7B, Ni electrolytic plating is performed so as to form a plating member to be formed in the plating Window 706 to have a hemispherical shape of 50 µm in radius. Then, the photoresist 704 is removed to form the optical path converting structure 708. Furthermore, the optical path converting structure 710 having a quadratic-pyramid shape of 50 µm in height is formed by using a mold formed by using an Si(111) surface, and the optical path converting structure 710 is placed on the plating entire surface electrode 702. Subsequently, as shown in FIG. 7C, a polycarbonate resin having a larger refractive index than the glass substrate 700 is applied and cured to form the core layer 712 having a film thickness of 120 µm. Then, a norbornene resin having a smaller refractive index than the core layer 712 is applied and cured to form the second cladding layer 714 having a film thickness of 50 µm.

Subsequently, as shown in FIG. 7D, the electrode 716 is formed on the second cladding layer 714. At this time, a hole for mounting the vertical cavity surface-emitting laser 718 is formed by laser beam machining so as to couple an outgoing beam from the vertical cavity surface-emitting laser 718 to the optical path converting structure 710. At the same time, a hole for mounting the light-receiving device 720 is also formed. Then, the vertical cavity surface-emitting laser 718 and the light-receiving device 720 are mounted by being inserted into corresponding mounting holes using a flip chip bonder. Subsequently, as shown in FIG. 7E, a portion at or upper than a level of the core layer 712 is peeled off from the glass substrate 700. After that, as necessary, as shown in FIG. 7F, the portion at or upper than the level of the core layer 712 that has been peeled off is bonded to the first cladding layer 722 having a smaller refractive index than the core layer 712. By using a norbornene resin film or the like as the first cladding layer 722, an optical connector device can be obtained, which can be bent flexibly.

The optical path converting structures used in this embodiment have two kinds, that is, the optical path converting structure 708 having a hemispherical shape and the optical path converting structure 710 having a quadratic-pyramid shape. However, the optical path converting structures used may all be the optical path converting structures each having a quadratic-pyramid shape. Alternatively, as in the first embodiment, the optical path converting structures used may all be the optical path converting structures each having a hemispherical shape.

Third Embodiment

Figure 8A:
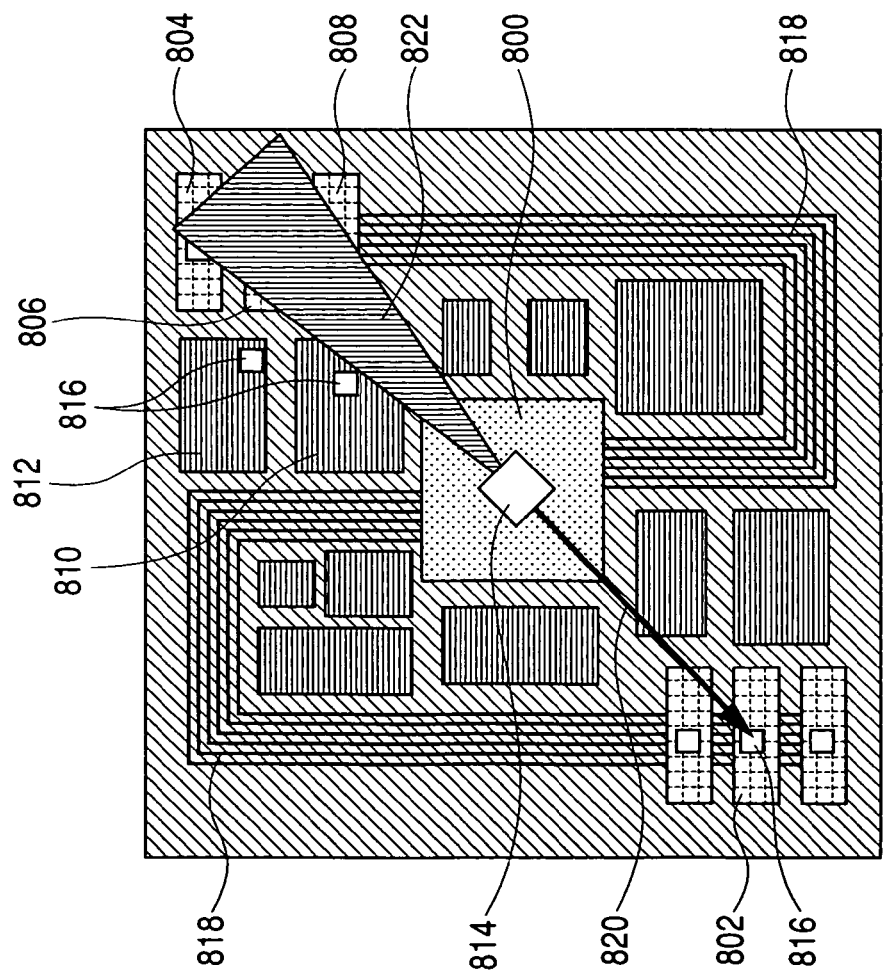
FIGS. 8A and 8B are diagrams for explaining an optical and electrical circuit combined board according to a third embodiment of the present invention.
Figure 8B:
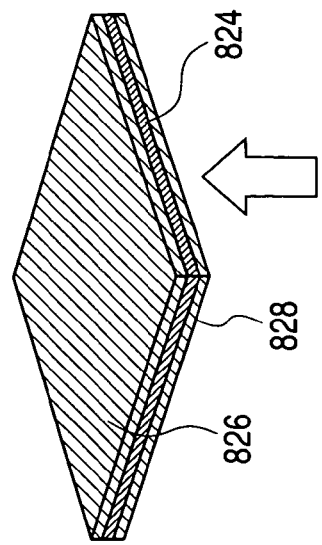

FIGS. 8A and 8B show an optical and electrical circuit combined board produced by combining the optical connector devices shown in the first embodiment and the second embodiment and an electrical circuit board. In FIGS. 8A and 8B, reference numeral 800 denotes a CPU; 802, 804, 806, and 808, RAMs; 810 and 812, electronic devices (LSIs); 814, a two-by-two vertical cavity surface-emitting laser array; 816, a light-receiving device; 818, a transmission line (electrical wiring); 820, a beam light; 822, a diffused light; 824, a two-dimensional optical waveguide layer; and 826 and 828, electrical circuit boards. FIG. 8A is a diagram of the optical and electrical circuit combined board of FIG. 8B viewed from an arrow direction. In FIG. 8A, the two-dimensional optical waveguide layer 824 and the electrical circuit board 828 are not shown.

Figure 9:
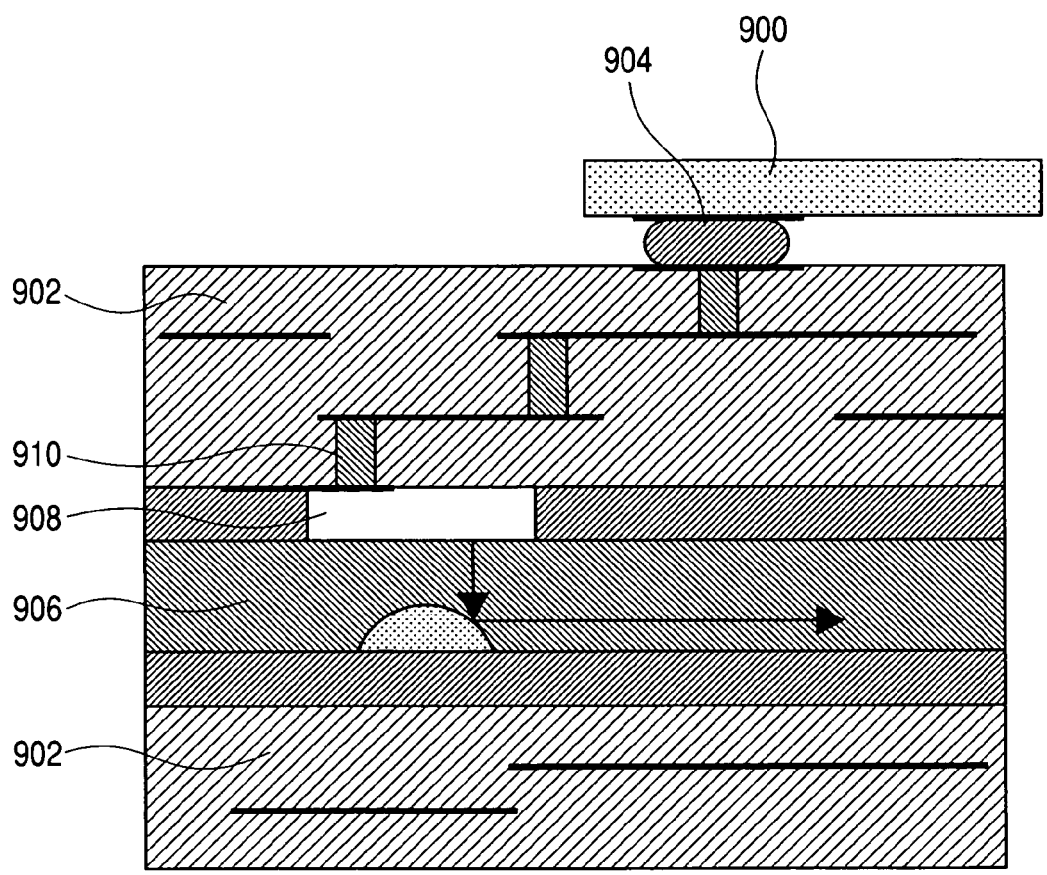
FIG. 9 is a diagram for explaining an inside of the optical and electrical circuit combined board according to the third embodiment of the present invention.

FIG. 9 is a sectional view of the optical and electrical circuit combined board in the vicinity of the vertical cavity surface-emitting laser array connected to the CPU. A CPU 900 is flip-chip-bonded on an electrical circuit board 902 using a solder ball 904. The CPU 900 and a vertical cavity surface-emitting laser array 908 incorporated in a two-dimensional optical waveguide layer 906 are connected through internal wirings 910 formed in the electrical circuit board 902.

According to the conventional electrical wirings, there is no problem with low-speed data transfer, but in the case where large-capacity, high-speed transmission is necessary, the adverse effect of EMI is large, making it difficult to constantly transfer data in a stable manner. In such a case, by using the optical and electrical circuit combined board as shown in FIGS. 8A and 8B, it becomes possible to stably perform the large-capacity, high-speed transmission.

Now, description will be made of a signal transmission method for, for example, converting an electrical signal from the CPU into an optical signal through the vertical cavity surface-emitting laser and transmitting the optical signal to the light-receiving device that is electrically connected to the RAM or the LSI. The two-by-two vertical cavity surface-emitting laser array 814 connected to the CPU 800 is embedded in a two-dimensional optical waveguide element, and a beam light going out from each vertical cavity surface-emitting laser thereof is coupled to an optical path converting structure (not shown) in its vicinity and propagates within a two-dimensional optical waveguide substrate. At this time, the injection current to each vertical cavity surface-emitting laser can be controlled to select from the beam light propagation, the diffused light propagation, and both type of propagation. Also, by controlling the injection current in the case of the diffused propagation, a spread angle for diffused light propagation is increased to 90° at maximum for each vertical cavity surface-emitting laser, so that the two-by-two vertical cavity surface-emitting laser array can be used to allow the diffused lights to propagate substantially over an entire area of the two-dimensional optical waveguide layer. The light thus propagating within the two-dimensional optical waveguide layer is coupled to the optical path converting structure provided in the vicinity of the light-receiving device to be led to the light-receiving device. The light-receiving device is connected to the RAM or the LSI, and converts the optical signal into the electrical signal.

In the operational example shown in FIGS. 8A and 8B, by controlling the injection current to each vertical cavity surface-emitting laser of the two-by-two vertical cavity surface-emitting laser array 814, a high-speed signal is transmitted to the RAM 802 by the beam light propagation, and is simultaneously transmitted to the three RAMs 804, 806, and 808 by the diffused light propagation. Although not shown, by controlling the injection current, the spread angle for diffused light propagation can be further increased, allowing the signal to propagate to the LSIs 810 and 812 as well.

Note that the CPU, RAM, and LSI are each connected to the vertical cavity surface-emitting laser and the light-receiving device so as to be able to transmit optical signals to one another. In this embodiment, the two-by-two vertical cavity surface-emitting laser array is used, but an element obtained by arraying more vertical cavity surface-emitting lasers may be used.

Further, in this embodiment, the two-dimensional optical waveguide layer has a configuration in which the two-dimensional optical waveguide layer is sandwiched between the electrical circuit boards, but there is no limitation thereto. The two-dimensional optical waveguide layer may be formed in one of an upper portion and a lower portion of the electrical circuit board, or may have a combined form thereof. The two-dimensional optical waveguide layer is formed as a single layer, but may be a multi-layer.

Moreover, a signal is not necessarily transmitted by light, and the configuration has flexibility in selection so as to allow the transmission through the electrical wirings. A device that administers the transmission determines whether the signal is transmitted by light or electricity.

As described above, by using the two-dimensional optical waveguide layer (optical circuit), it becomes possible to greatly reduce the electromagnetic radiation noise causing the problems with the conventional signal lines in that the wirings themselves become an antenna, causing malfunctions of a circuit due to common-mode noise radiation. Accordingly, the problems of the EMI can be improved. Further, by controlling the injection current to the vertical cavity surface-emitting laser, the oscillation modes can be switched over. Accordingly, any one of the beam light propagation and the diffused light propagation can be selected. In the beam light propagation, an optical power loss is suppressed, allowing the high-speed transmission. In the diffused light propagation, the spread angle for diffused light propagation can be changed by changing the injection current, allowing the optical signal transmission region to be reconfigured.

What is claimed is:

1. An optical connector device, comprising:
   an optical waveguide layer;
   a laser array having a first surface emitting laser and a second emitting later;
   an optical path changing structure for changing an optical path of a light from the first laser or the second laser; and
   light-receiving elements for receiving the light from the first laser or the second laser through the optical waveguide layer,
   wherein the first surface emitting laser emits a beam light to one receiving element and the second surface emitting laser emits light which is diffused by the optical path changing structure and is subsequently sent to a plurality of receiving elements.

2. An optical connector device according to claim 1, wherein the optical path changing structure is disposed within the optical waveguide layer.

3. An optical connector device according to claim 1, wherein the surface-emitting laser is formed with a current blocking layer in a vicinity of an active layer.

4. An optical and electrical wiring combined substrate, comprising:
   the optical connector device according to claim 1 formed so as to obtain electrical connection with an electrical circuit board,
   wherein a part of or whole signals from the electrical circuit board are transmitted by optical wirings as transmission of optical signals using the optical connector device.

* * * * *